(12) United States Patent
Chander et al.

(10) Patent No.: US 7,574,695 B2
(45) Date of Patent: Aug. 11, 2009

(54) PERFORMING CHECKS ON THE RESOURCE USAGE OF COMPUTER PROGRAMS

(75) Inventors: Ajay Chander, San Francisco, CA (US); Nayeem Islam, Palo Alto, CA (US); David Espinosa, Palo Alto, CA (US); George Necula, Oakland, CA (US); Peter Lee, Pittsburgh, PA (US)

(73) Assignee: NTT DoCoMo, Inc., Tokyo (JP)

( * ) Notice: Subject to any disclaimer, the term of this patent is extended or adjusted under 35 U.S.C. 154(b) by 722 days.

(21) Appl. No.: 11/019,868

(22) Filed: Dec. 21, 2004

(65) Prior Publication Data

US 2005/0166095 A1 Jul. 28, 2005

Related U.S. Application Data

(60) Provisional application No. 60/532,359, filed on Dec. 23, 2003.

(51) Int. Cl.
G06F 9/44 (2006.01)
(52) U.S. Cl. .......................... 717/126; 717/131
(58) Field of Classification Search ................ 717/100, 717/106, 107, 114, 120, 121, 122, 123, 124, 717/126, 127, 132, 139, 141, 154, 155, 168, 717/174, 152, 153
See application file for complete search history.

(56) References Cited

U.S. PATENT DOCUMENTS

| | | | | |
|---|---|---|---|---|
| 6,546,546 B1 * | 4/2003 | Van Doorn | | 717/114 |
| 6,553,362 B2 * | 4/2003 | Saxe et al. | | 706/47 |
| 6,817,014 B2 * | 11/2004 | Hundt et al. | | 717/159 |
| 6,886,094 B1 * | 4/2005 | Blandy | | 712/244 |
| 7,207,045 B2 * | 4/2007 | Goiffon | | 718/107 |
| 7,260,746 B2 * | 8/2007 | Demsky et al. | | 714/38 |
| 2002/0083418 A1 * | 6/2002 | Saxe et al. | | 717/126 |
| 2002/0133806 A1 * | 9/2002 | Flanagan et al. | | 717/123 |
| 2003/0126590 A1 * | 7/2003 | Burrows et al. | | 717/154 |

FOREIGN PATENT DOCUMENTS

EP 1217520 A1 6/2002

OTHER PUBLICATIONS

Nimmer, Jeremy and Michael Ernst; Static verification of dynamically detected program invariants: Integrating Daikon and ESC/Java; Jul. 23, 2001; In proceedings of RV'01, First Work-shop on Run-time Verification, Paris, France.*
Saidi, Hassen et al.; Self-Regenerative Software Components; Oct. 31, 2003; ACM New York, NY; p. 115-120.*

(Continued)

Primary Examiner—Wei Y Zhen
Assistant Examiner—Chih-Ching Chow
(74) Attorney, Agent, or Firm—Blakely, Sokoloff, Taylor & Zafman LLP

(57) ABSTRACT

A method and apparatus for performing checks on program code. In one embodiment, the method comprises receiving program code and statically verifying information about one or more dynamic checks in the program code, where each of the one or more dynamic checks in the program code checks an operation in the program code.

29 Claims, 20 Drawing Sheets

OTHER PUBLICATIONS

Kumar, Scott K. et al.; Retargetable and reconfigurable software dynamic translation; Mar. 23-26, 2003; Code Generation and Optimization, 2003. CGO 2003. International. p. 36-47.*

Hawblitzel, Chris et al.; A Case for Language-Based Protection; Mar. 1998; Dept. of Comp. Sci., Cornell Univ., Tech. Reports TR98-1670.*

Evans, David; Static Detection of Dynamic Memory errors; ACM; 1996.*

Crary, Karl; Resource Bound Certification; Annual Symposium on Principles of Programming Language; Proceedings of the 27th ACM SIGPLAN-SIGACT symposium of Principles of programming languages: ACM 2000.*

Saidi, hassen et al; Self-Regenerative Software Components; Oct. 2003; ACM NY, NY, p. 115-120.*

Kumar, Scott Retargetable and reconfigurable software dynamic translation; Mar. 2003; Code Generation and Optimization, 2003.*

Hawblitzel, Chris; A Case for Language-Based Protection; Mar. 1998; Cornell Univ. Tech Reports TR98-1670.*

Flanagan, Cormac et al., "Extended Static Checking for JAVA", Proceedings of the ACM SIGPLAN 2002 Conference on Programming language design and implementation table of contents, Berlin, Germany, pp. 234-245.*

International Search Report mailed Mar. 27, 2006. PCT/US2004/043654. 6 pages.

Written Opinion of the International Searching Authority. PCT/US2004/043654. 7 pages.

Crary K; Weirich S, "Resouce Bounds Certification". Proceeding of POPL '00: Symposium on Principles of Programming Languages, 200. XP002371010. Boston, MA, USA.

Wallach D E, et al, "SAFKASI: A Security Mechanism for Language-Based Systems" ACM Transactions of Software Engineering and Methodology, Association for Computing Machinery, New York, US. vol. 9, No. 4, Oct. 2000. pp. 341-378. XP008058988.

Appel A W, et al, "A Trustworthy Proof Checker", Journal of Automated Reasoning, vol. 31, No. 3-4. Sep. 2003. XP002371012.

PCT Written Opinion for PCT Appln No. US2004/043654, mailed Jun. 26, 2006 (7 pages).

Crary, K; Weirch, S: "Resource bound certification" Proceedings of POPL '00: Symposium on Principles of Programming Languages, 2000, XP002371010 Boston, MA, USA.

Bledsoe, W.W., "The Sup-Inf method in Presurger arithmetic," Technical Report, University of Texas Math Department, Dec. 1974.

Detlefs, David, "An overview of the Extended Static Checking System," *Proceedings of the First Formal Methods in Software Practice Workshop*, 1996.

Detlefs, David L. et al., "Extended static checking," *SRC Research Report 159*, Compaq Systems Research Center, 130 Lytton Avenue, Palo Alto, Dec. 1998.

Dijkstra, Edsger, *A Discipline of Programming*. Prentice-Hall, 1976. pp. 37-40.

Erlingsson, Ulfar, et al., "SASI enforcement of security policies: a retrospective," *New Security Paragdigms Workshop*, Caledon, Canada, Sep. 1999.

Luckham et al., "Stanford Pascal verifier user manual," Technical Report STAN-CS-79-731, Department of Computer Science, Stanford University, Mar. 1979.

Fitzgerald, Robert et al., "Marmot: an optimizing complier for Java," *Software Practice and Experience*, 30(3): 199-232, Mar. 2000.

Gong Li, *Inside Java 2 Platform Security*. Addison-Wesley, 1999. pp. 43-106.

Hopcroft, J. E., et al., *Introduction to Automata Theory, Languages, and Computation*, Addison Wesley Publishing Company, Massachusetts, 1979. pp. 77-92.

Kim, Moonjoo, et al., "JavaMaC: a run-time assurance tool for Java programs," *Electronic Notes in Theoretical Computer Science*, 55(2), 2001.

Mitchell, J. C., *Foundations for Programming Languages*. MIT Press, 1996. pp. 75-76.

Morrisett, Greg, et al., "From system F to typed assembly language," *Principles of Programming Languages*, San Diego, California, Jan. 1998.

Necula, George, *Computing with proofs*, PhD thesis, Carnegie Mellon, 1998.

Nelson, Greg et al., Simplification by cooperating decision procedures, *ACM Transactions on Programming Languages and Systems*, 1(2)245-257, Oct. 1979

Owre, S. et al., "PVS: A prototype verification system," In Deepka Kapur, editor, *11th International Conference on Automated Deduction (CADE)*, vol. 607 of *Lecture Notes in Artificial Intelligence*, pp. 748-752, Saratoga, NY, Jun. 1992. Springer-Verlag.

Pandey, Raju et al., "Providing fine-grained access control for Java programs via binary editing," *Concurrency: Practice and Experience*: 12:1405-1430, 2000.

Shostak, Robert, "Deciding linear inequalities by computing loop residues," *Journal of the ACM*, 28(4) 769-779, Oct. 1981.

Shostak, Robert E., "Deciding combinations of theories," *Journal of the ACM*, 31(1):1-12, Jan. 1984.

Wallach, Dan et al., "Extensible security architectures for Java," *16th Symposium on Operating Systemse Principles*, Saint-Malo, France, Oct. 1997.

Xi, Hongwei et al., "Eliminating array bound checking through dependent types," *Programming Language Design and Implementation*, Montreal, Canada, Jun. 1998.

* cited by examiner

Program *Dynamic*
    while read( ) ≠ 0
        acquire 1
        consume 1
    inv (*true*, 0)

Program *Static*
    acquire 10000
    $i := 0$
    while $i < 10000$
        consume 1
        $i := i + 1$
    inv ($i \leq 10000$, $10000 - i$)

Program *Mixed1*
    $N := $ read( )
    acquire $N$
    $i := 0$
    while $i < N$
        consume 1
        $i := i + 1$
    inv ($i \leq N$, $N - i$)

Program *Mixed2*
    while read( ) ≠ 0
        acquire 100
        $i := 0$
        while $i < 100$
            consume 1
            $i := i + 1$
        inv ($i \leq 100$, $100 - i$)

FIG. 2

$e ::= x \mid n \mid e_1 + e_2 \mid n * e \mid \text{cond}(b, e_1, e_2)$  Integer expressions
$b ::= \text{true} \mid e_1 \geq e_2 \mid e_1 = e_2$  Boolean expressions
$c ::= \text{skip} \mid x := e \mid c_1; c_2 \mid$
  $\text{consume } e \mid \text{recycle } e \mid$
  $\text{acquire } e \mid \text{release } e \mid \text{available } (A, e) \mid$
  $\text{if } b \text{ then } c_1 \text{ else } c_2 \mid$
  $\text{while } b \text{ do } c \text{ inv } (A, e)$  Commands
$P ::= b \mid P_1 \wedge P_2 \mid A \rightarrow P \mid$
  $\forall x.P \mid \text{cond}(b, P_1, P_2)$  Predicates
$A ::= b \mid A_1 \wedge A_2$  Annotations

FIG. 7

$$\frac{}{(\text{skip}, \sigma, n) \downarrow (\sigma, n)} \text{SKIP} \qquad \frac{(c', \sigma, n) \downarrow (\sigma', n') \quad (c'', \sigma', n') \downarrow R}{(c'; c'', \sigma, n) \downarrow R} \text{SEQ}$$

$$\frac{(c', \sigma, n) \downarrow \text{Error}}{(c'; c'', \sigma, n) \downarrow \text{Error}} \text{SEQE} \qquad \frac{}{(x := e, \sigma, n) \downarrow (\sigma [x := [e] \sigma], n)} \text{ASSIGN}$$

FIG. 11

$$\frac{[b]\sigma = \text{true} \quad (c, \sigma, n) \Downarrow R}{(\text{if } b \text{ then } c \text{ else } (c', \sigma, n) \Downarrow R} \text{IFT} \quad \frac{[b]\sigma = \text{false} \quad (c', \sigma, n) \Downarrow R}{(\text{if } b \text{ then } c \text{ else } (c', \sigma, n) \Downarrow R} \text{IFF}$$

$$\frac{[b]\sigma = \text{false} \quad \sigma \models P \quad n \geq [e]\sigma}{(\text{while } b \text{ do } c \text{ inv } (P, e), \sigma, n) \Downarrow (\sigma, n)} \text{WHILEF}$$

$$\frac{\sigma \models P \quad n \geq [e]\sigma \quad (c, \sigma, n) \Downarrow (\sigma', n') \quad [b]\sigma = \text{true} \quad \sigma' \models P \quad n' \geq [e]\sigma'}{(\text{while } b \text{ do } c \text{ inv } (P, e) \sigma', n') \Downarrow R} \text{WHILET}$$

$$\frac{[b]\sigma = \text{true} \quad (c, \sigma, n) \Downarrow \text{Error}}{(\text{while } b \text{ do } c \text{ inv } (P, e), \sigma, n) \Downarrow \text{Error}} \text{WHILETE}$$

$$\frac{\sigma \not\models P}{(\text{while } b \text{ do } c \text{ inv } (P, e), \sigma, n) \Downarrow \text{InvFailure}} \text{WHILEINVFA}$$

$$\frac{n < [e]\sigma}{(\text{while } b \text{ do } c \text{ inv } (P, e), \sigma, n) \Downarrow \text{InvFailure}} \text{WHILEINVFB}$$

FIG. 12

$$\frac{\sigma \models A \quad n \geq [e]\sigma}{(\text{available } (A, e), \sigma, n) \downarrow (\sigma, n)} \text{ AVAILABLE}$$

$$\frac{\sigma \not\models A}{(\text{available } (A, e), \sigma, n) \downarrow (\sigma, n)} \text{ AVAILABLEINVFA}$$

$$\frac{n < [e]\sigma}{(\text{available } (A, e), \sigma, n) \downarrow (\sigma, n)} \text{ AVAILABLEINVFB}$$

$$\frac{n \geq [e]\sigma}{(\text{consume } e, \sigma, n) \downarrow (\sigma, n - [e]\sigma)} \text{ CONSUMEOK}$$

$$\frac{n < [e]\sigma}{(\text{consume } e, \sigma, n) \downarrow \text{QuotaExceeded}} \text{ CONSUMEFAIL}$$

$$\frac{}{(\text{recycle } e, \sigma, n) \downarrow (\sigma, n + [e]\sigma)} \text{ RECYCLEOK}$$

$$\frac{}{(\text{acquire } e, \sigma, n) \downarrow (\sigma, n + [e]\sigma)} \text{ ACQUIREOK}$$

$$\frac{}{(\text{acquire } e, \sigma, n) \downarrow \text{ReservationFailed}} \text{ ACQUIREFAIL}$$

$$\frac{n \geq [e]\sigma}{(\text{release } e, \sigma, n) \downarrow \sigma, n - [e]\sigma)} \text{ RELEASEOK}$$

$$\frac{n < [e]\sigma}{(\text{release } e, \sigma, n) \downarrow \text{ReleaseFailed}} \text{ RELEASEFAIL}$$

FIG. 13

$$\text{scg}(\text{skip},\ (P,\ e)) = (P,\ e)$$

$$\text{scg}(c_1;\ c_2,\ (P,\ e)) = \text{scg}(c_1,\ \text{scg}(c_2,\ (P,\ e)))$$

$$\text{scg}(x := e',\ (P,\ e)) = ([e'/x]P,\ [e'/x]e)$$

$$\text{scg}(\text{consume}\ e',\ (P,\ e)) = (P \wedge e' \geq 0,\ e' + \text{cond}(e \geq 0,\ e,\ 0))$$

$$\text{scg}(\text{recycle}\ e',\ (P,\ e)) = (P \wedge e' \geq 0,\ e - e')$$

$$\text{scg}(\text{acquire}\ e',\ (P,\ e)) = (P \wedge e' \geq 0,\ e - e')$$

$$\text{scg}(\text{release}\ e',\ (P,\ e)) = (P \wedge e' \geq 0,\ e' + \text{cond}(e \geq 0,\ e,\ 0))$$

$$\text{scg}(\text{available}\ (A_l, e_l),\ (P,\ e)) = (A_l \wedge \forall \vec{x}.A_l \to P \wedge e_l \geq e,\ e_l)$$

$$\text{scg}(\text{if}\ b\ \text{then}\ c_1\ \text{else}\ c_2,\ (P,\ e)) = (\text{cond}(b,\ P_1,\ P_2),\ \text{cond}(b,\ e_1,\ e_2))$$

$$\text{where}\ (P_1,\ e_1), = \text{scg}(c_1,\ (P,\ e))$$

$$\text{and}\ (P_2,\ e_2), = \text{scg}(c_2,\ (P,\ e))$$

$$\text{scg}(\text{while}\ b\ \text{do}\ c\ \text{inv}\ (A_l, e_l),\ (P,\ e)) = (A_l \wedge \forall \vec{x}.A_l \to \text{cond}(b,\ P' \wedge e_l \geq e',$$

$$P \wedge e_l \geq e),\ e_l)$$

$$\text{where}\ (P',\ e') = \text{scg}(c,\ (A_l, e_l))$$

and $\vec{x}$ are the variables modifies in $c$

FIG. 14

$$\text{prove}(A, b) = \neg\text{sat}(A \wedge \neg b)$$

$$\text{prove}(A, P_1 \wedge P_2) = \text{prove}(A, P_1) \wedge \text{prove}(A, P_2)$$

$$\text{prove}(A, A_1 \rightarrow P) = \text{prove}(A \wedge A_1, P)$$

$$\text{prove}(A, \forall x.\, P) = \text{prove}(A, [a/x]P) \; (a \text{ is fresh})$$

$$\text{prove}(A, \text{cond}(b, P_1, P_2)) = \text{prove}(A \wedge b, P_1) \wedge \text{prove}(A \wedge \neg b, P_2)$$

FIG. 16

```
acquire n;
i := 0;
while (i < n) {
    consume 1;
    i := i + 1;
} inv (i ≤ n, n - i)
```

FIG. 18

$(n \geq 0 \wedge \forall i.i \leq n \rightarrow$
cond $(i < n,$
    $i + 1 \leq n \wedge i \geq 0 \wedge n - i \geq n - i,$
    $true \wedge n - i \geq 0)$
$\wedge n \geq 0,$
$n - 0 - n)$

FIG. 19

PERFORMING CHECKS ON THE RESOURCE USAGE OF COMPUTER PROGRAMS

PRIORITY

The present patent application claims priority to the corresponding provisional patent application Ser. No. 60/532,359, entitled, "Flexible and Efficient Method for Limiting the Resource Usage of Computer Programs," filed on Dec. 23, 2003 assigned to the assignee of the present invention and incorporated herein by reference.

FIELD OF THE INVENTION

The present invention is related to the field of checking of computer programs; more particularly, the present invention is related to performing both static and dynamic checking in which information about dynamic checks in the computer program are verified statically.

BACKGROUND OF THE INVENTION

Programs are created by individuals referred to herein as code producers and run by individuals referred to herein as code consumers. The code consumer does not want to run an untrusted program created by the code producer because the program communicates with the code consumer's computer via a runtime library, which provides functions to access resources such as files and the network. The code consumer wants to be sure that the program is safe, meaning that it does not corrupt user data, it does not export private data to outside sources, and it does not abuse system resources.

There are several existing methods for ensuring safety of a computer program. These include: computational isolation; dynamic checking; and static checking. With respect to computational isolation, one solution to the safety problem is to isolate the computing device, disallowing any new code or communication channels. This solution is unsatisfactory as it limits the usefulness of the device.

Dynamic checking refers to the process by which each potentially unsafe operation is checked just before it occurs. For example, if a safety policy forbids access to a particular directory, then the runtime (RT) library or RT monitor must check each file access. Dynamic checking has two advantages. First, it is precise. That is, it only detects safety violations that the program is actually going to commit. If the checker detects a violation, then the program would actually commit the violation had the user turned off the checker. Second, it is simple. The entire checker consists of simple checks that are placed in the runtime library alongside the appropriate routines. However, dynamic checking has two basic disadvantages. First, it is late because it detects errors at the last possible moment. Lateness is a problem because terminating the program without warning may surprise or confuse the user or cause her to lose valuable data. Also, when terminating the program, it may be difficult to recover operating system (OS) resources that the program has allocated, which may adversely affect the performance of other running programs. Second, dynamic checking is inefficient. Since every operation performs a check before executing, these checks occupy a considerable portion of CPU time.

In static checking, the entire program is analyzed before execution to see whether it is safe. Static checking has two advantages. First, static checking is early in that it detects all faults before execution begins. Thus, if the checker verifies the program, no runtime errors can occur, so the user cannot lose data, and the OS never has to terminate the program. Second, static checking is efficient. All checking is done based on the program text, so there are no runtime checks whatsoever, and the program can run at the same speed as a fully trusted program. Static checking also has two disadvantages. First, static checking is complex, because it tries to reason about program behavior, which is complex. Second, static checking is incomplete, meaning that it rejects some safe programs. This imprecision comes from two sources. First, programs are complex. Although the checker may be able to handle many simple programs, because many program properties of practical interest are undecidable, there are some safe programs that it cannot verify. Second, the static checker runs with incomplete information in that it knows the program but it does not know its input. The best result state checking can produce is to determine whether some input causes an unsafe action. It cannot determine whether this input actually occurs.

In the context of limiting resource usage, dynamic checking refers to the process by which a resource manager performs checks while the program runs, while static checking refers to the process by which the resource manager performs checks before the program runs. Dynamic checking is flexible but inefficient, while static checking is efficient but inflexible.

SUMMARY OF THE INVENTION

A method and apparatus for performing checks on program code. In one embodiment, the method comprises receiving program code and statically verifying information about one or more dynamic checks in the program code, where each of the one or more dynamic checks in the program code checks an operation in the program code.

BRIEF DESCRIPTION OF THE DRAWINGS

The invention, including its construction and method of operation, is illustrated more or less diagrammatically in the drawings, in which:

FIG. 2 shows four programs with reservations added;

FIG. 7 shows the full definition for one embodiment of the language, in a standard Backus-Naur format;

FIG. 11 illustrates the operational semantics for sequencing and assignment;

FIG. 12 illustrates the operational semantics for conditionals and loops;

FIG. 13 illustrates the operational semantics for reservations;

FIG. 14 is one embodiment of the code for a safety condition generator;

FIG. 16 is one embodiment of code for the prover;

FIG. 18 shows a small loop written with the while command;

FIG. 19 shows the safety condition for this example;

DETAILED DESCRIPTION OF THE INVENTION

Figure 1:
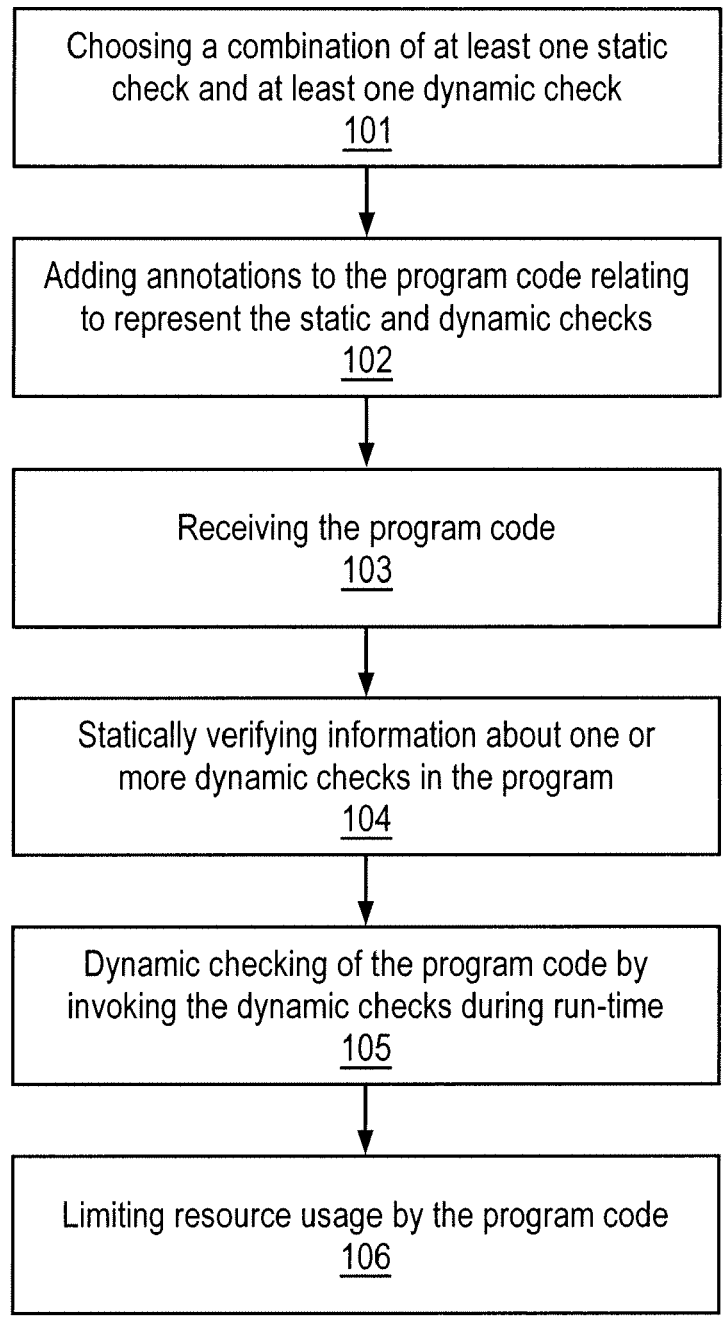
FIG. 1 is a flow diagram of one embodiment of a process for checking program code.

A method and apparatus for checking computer programs is described. The present invention allows a dynamic check to be moved arbitrarily in a computer program prior to the execution of an operation for which the dynamic check has been included. Embodiments of the present invention use static information to verify that a program has enough dynamic checks. Thus, the present invention is both flexible and efficient. The present invention provides the advantages of both static and dynamic checkers. Like the dynamic checker, it can safely execute all four programs. Like the static checker, it uses the static information available in each program to run more efficiently. In one embodiment, the techniques disclosed herein apply to all sequential computer programs and spend significantly less CPU time enforcing resource limits than previous methods.

In one embodiment, this method may be used for limiting the resources used by a computer program. Resources may include both physical resources (e.g., CPU, memory, disk, network) and virtual resources (e.g., files, processes). In one embodiment, if a program tries to use more resources than allowed, the resources are limited by having the system stop execution of the program, generate an interrupt, raise an exception, etc.

In one embodiment, resources are limited according to a user-defined security policy. This policy specifies the resources that each program can use and the corresponding usage bounds. In one embodiment, the resource usage limit ensures that the amount used of a resource is within an upper bound prescribed by either the operating system or by a system policy. Note that this is readily extensible to lower bounds and other kinds of constraints as well, such as upper and lower bounds on rate of resource usage.

In one embodiment, the techniques relevant to code safety described herein are based on novel abstractions and annotations for specifying resource reservations relevant to safety. In one embodiment, the method is based on a new class of instructions, or operations, that obtain resources from the operating system. Building on these new instructions, in one embodiment, a dynamic (execution time) component and a static (load time or compile time) component are indicated. Thus, embodiments of the present invention uses a mixed or hybrid approach. The dynamic component is a set of reservation functions that obtain and return resources from and to the operating system. A program is considered safe if it reserves all resources before using them. The static component is the verifier, which checks whether a program is safe. In one embodiment, the verifier only accepts safe programs in a manner that is optimal as defined herein.

Previous methods for resource limiting are inefficient because they use one reservation for each resource use. Since an embodiment of the present invention uses one reservation for many resource uses, it is orders of magnitude more efficient.

Although one embodiment of the present invention addresses resource usage, the present invention may be extended to other areas, such as, for example, address data corruption and privacy violation as well. For example, a desirable safety property may be that if a program cannot read a file, then it cannot export the data in that file.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

FIG. 1 is a flow diagram of one embodiment of a process for checking program code. The process is performed by processing logic that may comprise hardware (e.g., circuitry, dedicated logic, etc.), software (such as is run on a general purpose computer system or a dedicated machine), or a combination of both.

Referring to FIG. 1, the process begins by processing logic choosing a combination of at least one static check and at least one dynamic check for dynamic checking (processing block 101). In one embodiment, the static check comprises an abstraction in the form of an annotation that does not have a dynamic cost for the program to which it is added (e.g., not an operation that consumes any clock cycles when the program is executed). In one embodiment, the static check represents abstractly any machine instruction that consumes a resource of interest.

In one embodiment, the one or more dynamic checks comprise one or more dynamic annotations that may be added to a program for specifying a resource reservation. Unlike a static check, the dynamic check comprises an operation, which when added to a program incurs one or more cycles to execute when the program is executed. In one embodiment, at least one of the one or more dynamic checks is for checking usage of a resource. As discussed above, the resource may a physical resource (e.g., number of central processing unit (CPU) instructions executed, memory space, disk space, and network bandwidth) or a virtual resource (e.g., file handle, process).

Of course, the operating system eventually virtualizes all resources. In one embodiment, many resource usage properties are enforced, including current usage, cumulative usage, and rate of usage.

Next, processing logic adds annotations to the program code relating to represent the static and dynamic checks (processing block 102). In one embodiment, at least one of the one or more annotations includes an operation to reserve resources for use by a portion of the program code.

After the program has been annotated, processing logic receives the program code (processing block 103).

Then processing logic statically verifies information about one or more dynamic checks in the program code, where each of the one or more dynamic checks in the program code is for checking an operation in the program code (processing logic 104). At least one of the dynamic checks may determine if the operation is unsafe. In one embodiment, processing logic statically verifies information about one or more dynamic checks in program code by performing static analysis of the one or more dynamic checks.

In one embodiment, statically verifying information about one or more dynamic checks in program code comprises statically checking operations in the program code for reserving resources to determine whether resources being reserved by the operations are enough to account for all runtime operations that consume resources in the program code.

In one embodiment, processing logic statically verifies information about one or more dynamic checks by checking whether the program code will use more of one or more resources during run-time than the program code has reserved prior to execution.

In one embodiment, processing logic performs dynamic checking of the program code by invoking the dynamic checks during run-time (processing block 105).

In one embodiment, the process further comprises processing logic limiting resource usage by the program code (processing block 106). This occurs in response to determining that resource usage is outside a limit. In one embodiment, limiting resource usage by the program code comprises halting execution of the program code. In alternative embodiments, processing logic may raise an exception or generate an interrupt in response to determining that resource usage is outside a limit.

Embodiments of the present invention use abstractions for a new class of runtime operations, "acquire" and for a new class of annotations, "consume." The acquire operation is an example of a reservation instruction and occurs in programs created by the code producer. In one embodiment, the consume annotation occurs in the code consumer's runtime library.

The operation acquire n is used to perform a dynamic check to see whether the program can use n resource units. In one embodiment, if not, the program may be aborted. Variations are possible in which the acquire operation returns a boolean value or raises a user-handleable exception. If resources are available, it marks them for later use by the program so that no other programs can acquire them.

The annotation consume n marks all runtime operations that consume resources. In one embodiment, it performs no dynamic check and thus has no runtime cost. However, the code consumer statically checks that the program acquires enough resources to account for all consumes. Thus, in such a case, the annotation consume is an abstraction for any resource consuming operation.

In one embodiment, the value of the argument n for the annotations, static and dynamic, above is positive. This can be checked statically before program execution. FIG. 2 shows four programs with reservations added. Referring to FIG. 2, Program Dynamic reserves every resource just before it uses it. Programs Static and Mixed1 reserve all resources at the beginning. Program Mixed2 reserves some resources each time around its outer loop. Unlike a static checker, the techniques described herein handle all four programs. Unlike a dynamic checker, the approach uses the static information present in each program to execute more efficiently and to ensure that the dynamic checks are adequate to ensure safety.

Thus, one embodiment of the present invention identifies a midpoint in the original resource-use problem (consume≦quota), which allows partitioning the checking into two phases, choosing the most appropriate combination of static or dynamic checks for each phase.

Figure 3:
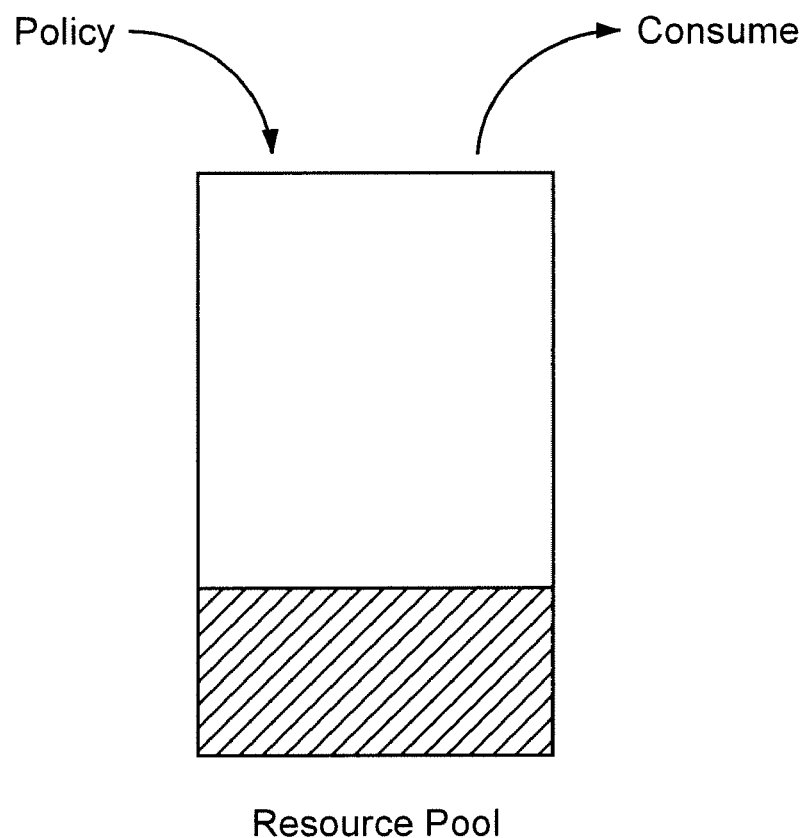
FIG. 3 shows a typical dynamic resource checker that contains a single resource pool that initially contains all resources allocated to the program by the code consumer's security policy.

FIG. 3 shows a typical dynamic resource checker that contains a single resource pool that initially contains all resources allocated to the program by the code consumer's security policy. The runtime library operations remove resources from the pool as they consume them. If an operation needs resources but the pool is empty, it terminates the program.

Figure 4:
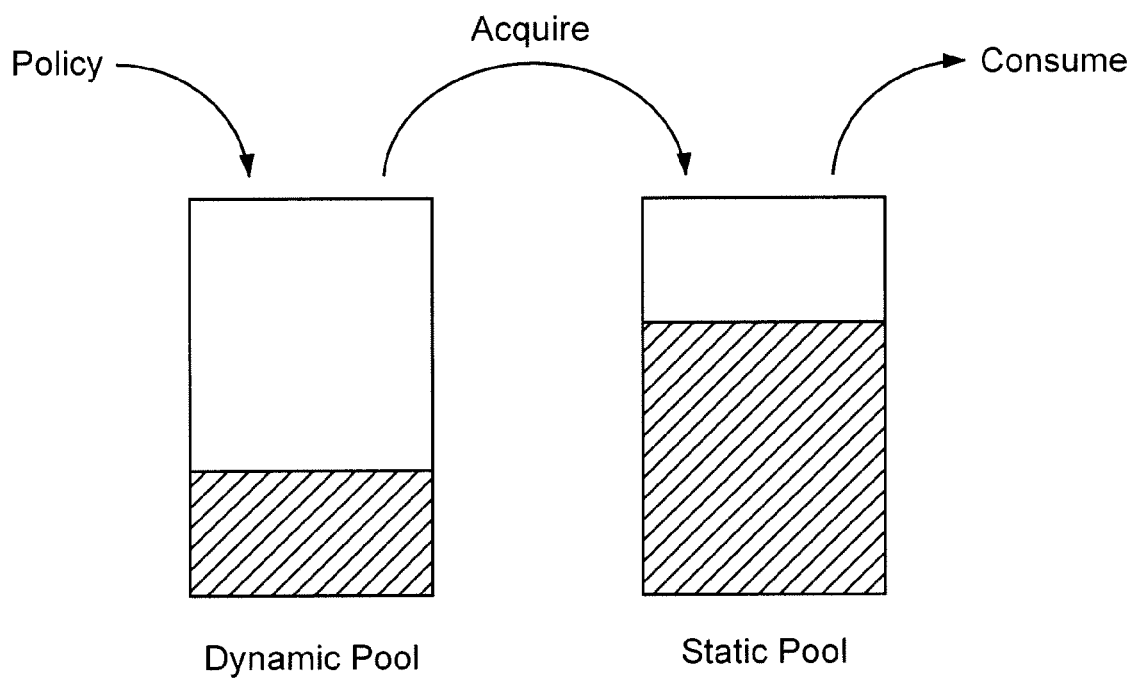
FIG. 4 shows a desirable pool resource model.

FIG. 4 shows a desirable pool resource model. Referring to FIG. 4, the program reserves resources before it uses them. Because of the additional acquire operations (annotations), the two-pool appears more expensive than the one-pool model, but it is not, because the acquire operations (annotations) are dynamic, while the consume annotations are static. Thus, the consume annotations take no execution time at all. Furthermore, because an acquire operation transfers many resources to program usage at once, there are far fewer acquire operations than consume annotations. Thus, the acquire operations and consume annotations in the two-pool model take much less time than the consume annotations in the one-pool model.

Some resources, such as memory or file descriptors, can be allocated, freed, then allocated again. These resources are called renewable or reusable. The release operations (dynamic annotations) for these resources are annotated with recycle 1, to indicate that the resource is available again. Furthermore, after enough resources have be "unused", a release n operation can be performed to release these resources back to the resource monitor. This operation enables the reservation of the resources again in a different section of the program, or using them in other programs.

Security Policy Applications

In one embodiment, the code consumer defines a security policy, which contains three parts: a set of resources, a set of (optional) resource bounds, and a description of the resources and operation uses.

Resource bounds can be optional, in which case the corresponding resource is unbounded. The annotator and verifier can choose to ignore unbounded resources. That is, the annotator need not insert reservations for them, and the verifier need not keep track of them. Therefore, if the code producer adds reservations, rather than the code consumer, it is convenient to download the code consumer's security policy, so that he knows which resources he does not need to reserve. If the code producer inserts more reservations than necessary, the code still passes verification, but runs slower than necessary.

Exemplary security policies that can be enforced by the techniques described herein include the following:

The maximum number of windows that can be opened by a program on the device is 5.
The maximum number of sockets that any program can open on the device is 2.
The maximum amount of memory that a program can write to on the device is 10 KB.

Note that the specific values are arbitrary.

Architectures and Protocols

Figure 5:
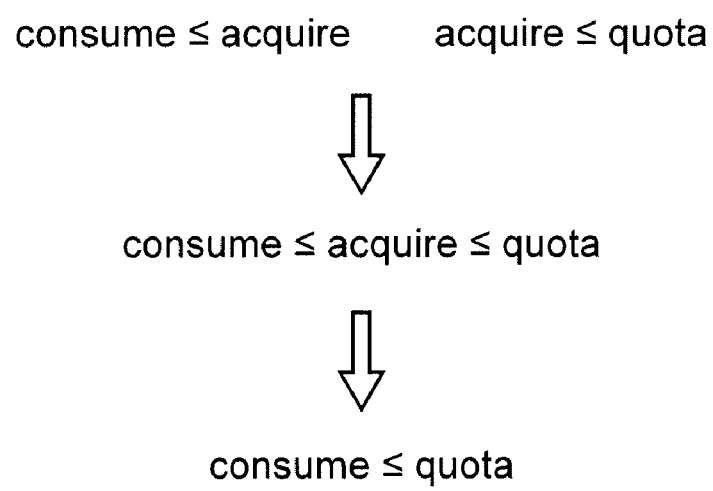
FIG. 5 illustrates an abstract resource-use safety through reservations.
Figure 6:
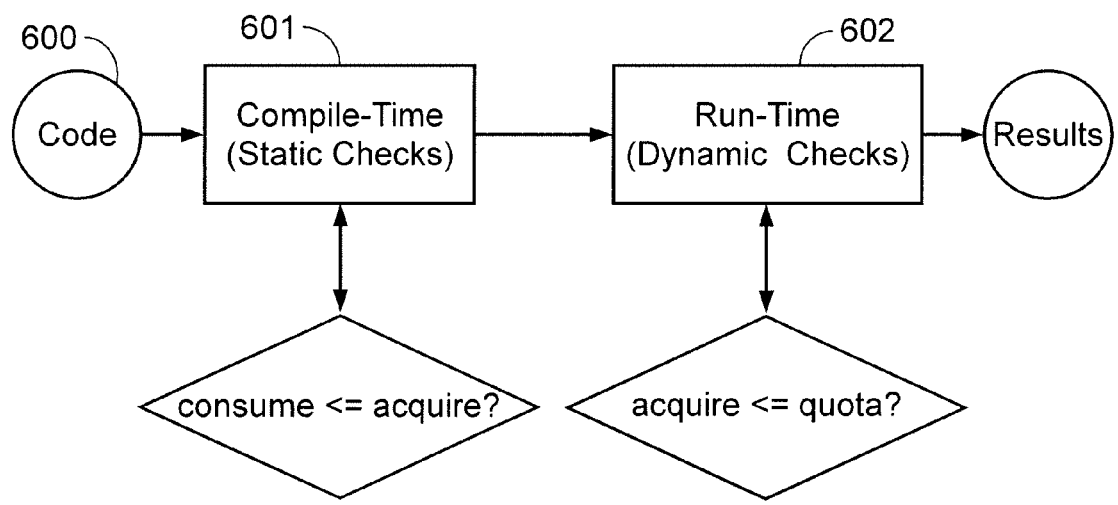
FIG. 6 illustrates partitioning code safety into static and dynamic components.

FIG. 5 illustrates abstractly resource-use safety through reservations. Referring to FIG. 5, ensuring that the consumption is less than or equal to the quota may be implemented by a reservation. The basic components in embodiments of the present invention enforce the two equations consume≦acquire and acquire≦quota. In one embodiment, the first equation is checked statically and the second equation is checked dynamically. FIG. 6 illustrates partitioning code safety into static and dynamic components. Referring to FIG. 6, code 600 is first statically checked for the condition consume≦acquire by compiler 601, and then run on a machine 603 that dynamically ensures that acquire≦quota.

In one embodiment, the reservation instructions (dynamic annotations) are acquire and release, which dynamically request and return resources to the operating system, respectively. In one embodiment, annotations are named consume and recycle, that operate on the static pool (see FIG. 4) and don't incur any runtime cost.

In order to describe the static checking procedure, a simple imperative programming language may be used that computes with integer values. In the following, the procedure is described using only one resource of interest whose amount is measured in some arbitrary unit. The annotation consume e is used to model any operation that uses e units of the resource, where e is an expression in the language. The command acquire e reserves e resource units from the operating system. This command may fail, but if it succeeds, then it is known that e resource units have been reserved for the running program. The corresponding commands and annotations that return resources to the operating system and to the static pool, respectively, are called release and recycle, respectively. For purposes herein, resources that have been reserved but not yet used are referred to as "available" resources.

FIG. 7 shows the full definition of one embodiment of the language, in a standard Backus-Naur format. In one embodiment, the variables x take only integer values. The expression cond(b, $e_1$, $e_2$) has value $e_1$ if the boolean expression b has value true and has value $e_2$ otherwise. Similarly, the command cond(b, $P_1$, $P_2$) is equivalent to the command $P_1$ if b has value true, and command $P_2$ otherwise. The propositional connectives $\wedge$, $\forall$, $\Rightarrow$ have their usual meaning.

In addition to acquire, release, consume, and recycle annotations, in one embodiment, the command available (A, e) is used. This command is ignored during execution but acts as a specification for the checking procedure. The programmer can use this command to assert that at a given point A is true and at least e resource units have been reserved but not yet used. This assertion is checked statically as part of the checking procedure.

Note also that the looping command is annotated with an invariant (A, e). During static checking, the predicate A is verified to determine if it holds and there are at least e resource units available before the looping command is executed. To simplify the task of the static checker, the invariants are restricted to a conjunction of boolean expressions and the left side of implications is similarly restricted to predicates.

More specifically, the meaning of expressions and commands are given below, and the precise ways in which execution can fail is made explicit, following well-known approaches to such operational specifications of programming language constructs. For example, see J. C. Mitchell, Foundations for Programming Language, MIT Press, 1996 for further explanation of the standard notation used in this description. The execution state is a pair $\langle \sigma, n \rangle$ of an environment $\sigma$ that maps variable names to integer values and a natural number n that represents the amount of available resources. The expression $[\![e]\!]\sigma$ is written for the value of the integer expression e in the environment $\sigma$ and $[\![b]\!]\sigma$ for the value of the boolean expression b in the environment $\sigma$. For example, $$[cond(b, e_1, e2)]\sigma = \begin{cases} [e_1]\sigma & \text{if } [\![b]\!]\sigma = \text{true} \\ [e_2]\sigma & \text{if } [\![b]\!]\sigma = \text{false} \end{cases}$$

The other cases of the definition are straightforward. The notation $\sigma[x:=n]$ denotes the environment that is identical to $\sigma$ except that x is set to n.

The basic building block for use with the language set forth herein is a safety condition generator. In one embodiment, the safety condition generator is combined with a proof checker to form a verifier. The verifier checks that a program has enough acquire operations to cover all the consume annotations, thereby indicating that the program doesn't use more resources than it has reserved. In one embodiment, the verifier takes into account resources freed by the release and recycle operations as well.

In one embodiment, verifier is a part of the code consumer's trusted computing base (TCB). It is the most general verifier possible, in that it generates the weakest condition that a producer's code must satisfy in order to ensure resource-use safety at the code consumer. As such, it is also agnostic to the method used to annotate the producer's code.

The verifier may be built in both source and binary forms, such that it can take source code or binary code as input, respectively. Although the source code form is checked herein, the binary forms are also easy to build. In one embodiment, the code producer only sends binary code to the code consumer.

A trusted verifier can be integrated into the code annotation and production process in several ways. Code annotation can be performed by either the code consumer, or the code producer, or possibly both. The results of annotation can also be edited by hand by either party. This is possible because the verifier is independent of the choice of annotation method used.

Figure 8:
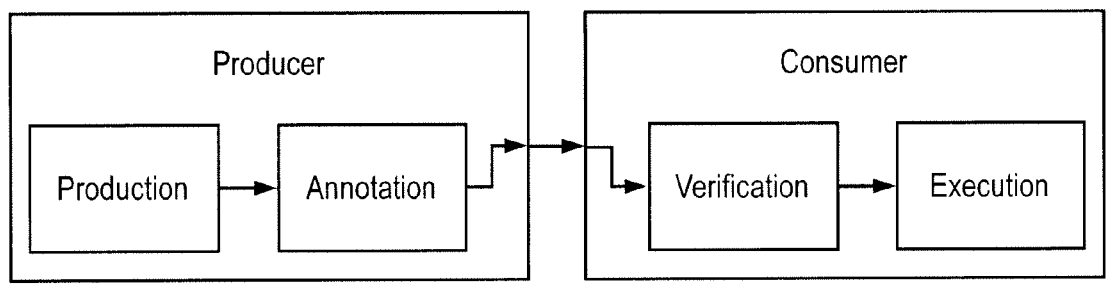
FIG. 8 illustrates a code producer performing the annotation (along with code production) and the consumer performing the verification (with execution)

FIG. 8 illustrates a code producer performing the annotation (along with code production) and the consumer performing the verification (with execution). In this case, the code producer runs a source annotator, and the code consumer runs a binary verifier. In one embodiment, the verifier is part of the TCB, but the annotator is not. This separation allows the code producer to improve the code by possibly using fewer reservations than an automatic annotator inserts. The verifier provides assurance, whereas the annotation process can be optimized for efficiency.

Figure 9:
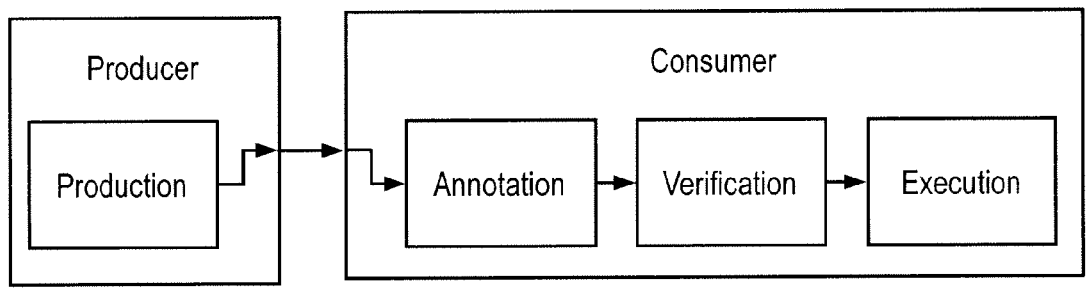
FIG. 9 illustrates another possible separation of the basic components between the producer and the verifier in which the code consumer performs the annotations and verifications.

Another possible separation of the basic components between the producer and the verifier is shown in FIG. 9. Referring to FIG. 9, the consumer annotates the code, and runs the binary verifier. The verifier is part of the TCB, and the annotator may or may not be.

In FIGS. 8 and 9, in alternative embodiments the consumer may comprise a general purpose computer system, a dedicated machine, a mobile device (e.g., a cellular or other portable phone), etc.

An Exemplary Verifier

Figure 10:
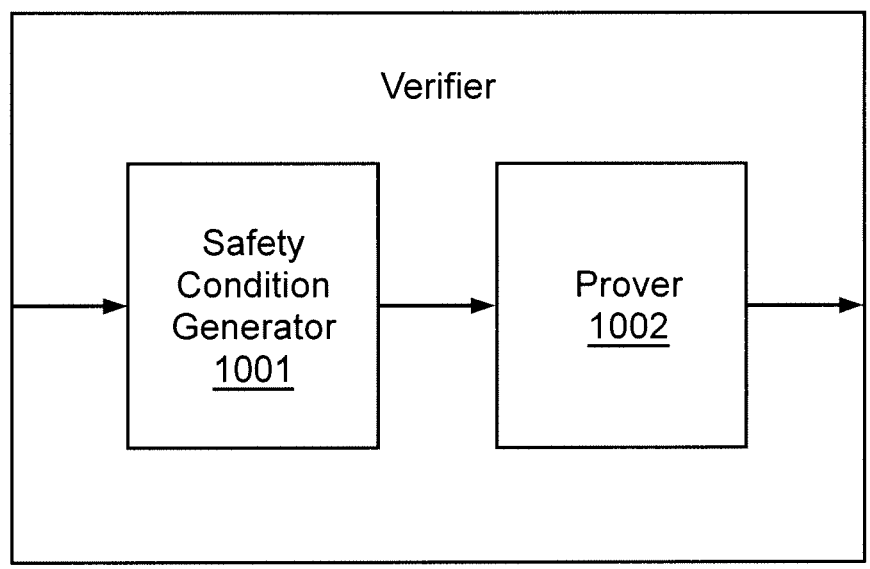
FIG. 10 is a block diagram of one embodiment of a verifier.

FIG. 10 is a block diagram of one embodiment of a verifier. Referring to FIG. 10, verifier 1000 includes safety condition generator 1001, which computes a program's safety condition (SC), and prover 1002, which actually proves the SC.

With respect to safety, the operational semantics of the language are defined in terms of the relation $\langle c,\sigma,n\rangle\Downarrow R$, which means that the evaluation of c starting in state $\langle\sigma,n\rangle$ terminates with result R. If there does not exist an R such that $\langle c,\sigma,n\rangle\Downarrow R$, then the expression is written $\langle c,\sigma,n\rangle\Uparrow$.

The result R can be one of the following types of values. If the command terminates normally, then R is a new state $\langle\sigma',n'\rangle$. If a reservation request fails, then R is the error ReservationFailed or the error ReleaseFailed. If the program tries to use more resources than are available, then R is the error QuotaExceeded. If the program does not meet a particular annotation, then R is the error InvFailure. The safety property specifies exactly that the QuotaExceeded and InvFailure errors do not occur.

FIGS. 11, 12, and 13 show the operational semantics for sequencing and assignments, conditionals and loops, and reservations, respectively.

Notice that the operational semantics also ensure that the program satisfies the annotations it comes with, and raises the error InvFailure otherwise. Since safe programs will never raise an InvFailure exception, there is no runtime overhead for these additional rules. The consume (release) command either terminates normally consuming (releasing) some available resources, if enough resources are available, or it yields a QuotaExceeded error. In one embodiment, the consume command does not perform any check on resources. The acquire command either increases the amount of available resources or it yields a ReservationFailed error. In this formalization, it is assumed that the acquire command is non-deterministic. In practice, its behavior is determined by the operating system. The recycle command releases some amount of previously used resources to the static pool.

Using this notion of evaluation, the desired safety policy can be stated. A command c is safe in state $\langle\sigma,n\rangle$ if either $\langle c,\sigma,n\rangle\Uparrow$, if $\langle c,\sigma,n\rangle\Downarrow$ ReservationFailed or ReleaseFailed, or if $\langle c,\sigma,n\rangle\Downarrow\langle\sigma',n'\rangle$ for some state $\langle\sigma',n'\rangle$. That is, the QuotaExceeded and InvFailure errors cannot occur. Thus, safe commands can either run forever, terminate with a reservation failure, or terminate normally.

With respect to soundness, given a command c, the expression $(P',e')=scg(c, (true, 0))$ is computed. In order to check that it is safe to execute the program in state $\langle\sigma,n\rangle$, the expression $\sigma\models P' \wedge e' \leq n$ is verified. This condition guarantees that if we execute the command c is executed in state $\sigma$ with n resource units available, c will not run out of resources. If c actually uses resources, it reserves them before use. As discussed below, this verification procedure is sound.

The expression $\sigma\models P$ indicates that predicate P holds in state $\sigma$. Recall P is a predicate over variables that are given a value by the state $\sigma$, which allows the expression $\sigma\models P$ to be defined by induction over the propositional connectives, in a manner well-known in the art. The main soundness lemma is stated as follows:

Lemma 1 For all commands c, predicates $P_0$ and $P_1$, expressions $e_0$ and $e_1$, states $\langle\sigma_0,n_0\rangle$, and results R, if $$(P_0,e_0)=scg(c,(P_1,e_1))$$

$$\sigma_0\models P_0 \wedge e_0 \leq n_0 \wedge n_0 \geq 0$$

then either

1. $\langle c,\sigma_0,n_0\rangle\Uparrow$ or
2. $\langle c,\sigma_0,n_0\rangle\Downarrow$ ReservationFailed or ReleaseFailed or
3. $\langle c,\sigma_0,n_0\rangle\Downarrow\langle\sigma_1,n_1\rangle$, in which case $\sigma_1\models P_1\wedge e_1\leq n_1 \wedge n_1\geq 0$.

Essentially, the lemma ensures that the QuotaExceeded and InvFailure errors never arise, as required by the safety policy.

Proof: By structural induction on the derivation $\langle c,\sigma_0,n_0\rangle\Downarrow R$.

Thus, safety is defined formally and it is shows that the safety condition generator is sound. That is, if the safety condition holds, then the program is safe.

In one embodiment, the safety condition generator is also optimal. More specifically, the safety condition for a command c and state $\langle\sigma,n\rangle$ guarantees that if the command c is executed in state a with n resource units available, c will not run out of resources. As shown below, the safety condition generator is optimal in that it provides a condition that is logically the weakest possible amongst all safe preconditions, defined below.

Definition 1 Given a command c and a resource-state predicate (P, e), the expression (P', e') is the weakest precondition for c and predicate (P, e) if the following hold:

1. (P', e') is a safe precondition for c and (P, e) i.e., $$\forall \sigma,\pi. \langle\sigma,\pi\rangle\models(P',e')\Rightarrow\langle c,\sigma,\pi\rangle\Downarrow\models(P,e).$$

2. (P', e') is the weakest precondition amongst all safe preconditions, i.e., $$\forall (P_1,e_1).$$

$$[\forall \sigma,\pi. \langle\sigma,\pi\rangle\models(P_1,e_1)\Rightarrow\langle c,\sigma,\pi\rangle\Downarrow\models(P,e)]$$

$$\Rightarrow(P_1,e_1)\Rightarrow(P',e')$$

where the expression is defined $(P,e)\Rightarrow(P',e')$ as $P\Rightarrow P' \wedge e\geq e'$, and $\langle\sigma,\pi\rangle\models(P,e)$, as $\sigma\models P\wedge\pi\geq\|e\|\sigma\wedge\pi\geq 0$. The notation $\langle c,\sigma,n\rangle\Downarrow$ denotes that the command c terminates in a new state or causes only the errors ReservationFailed or ReleaseFailed. In particular, it does not cause the errors InvFailure and QuotaExceeded.

Lemma 2 For all commands c and resource-state predicates (P, e), scg(c, (P, e)) is the weakest precondition for c and predicate (P, e).

Thus, this safety condition generator is optimal, in that the generated safety condition captures all programs that satisfy the annotations and are resource-use safe.

Safety Condition Generator

In one embodiment, the verifier uses a variant of Dijkstra's weakest precondition calculus. (Edsger Dijkstra, A Discipline of Programming, Prentice-Hall, 1976). For each program point, an invariant (A, e) is computed, such that at that point in all executions, A is satisfied and at least e resource units are available. In one embodiment, these invariants are computed starting from an invariant that holds at the end of program execution.

Figure 15:
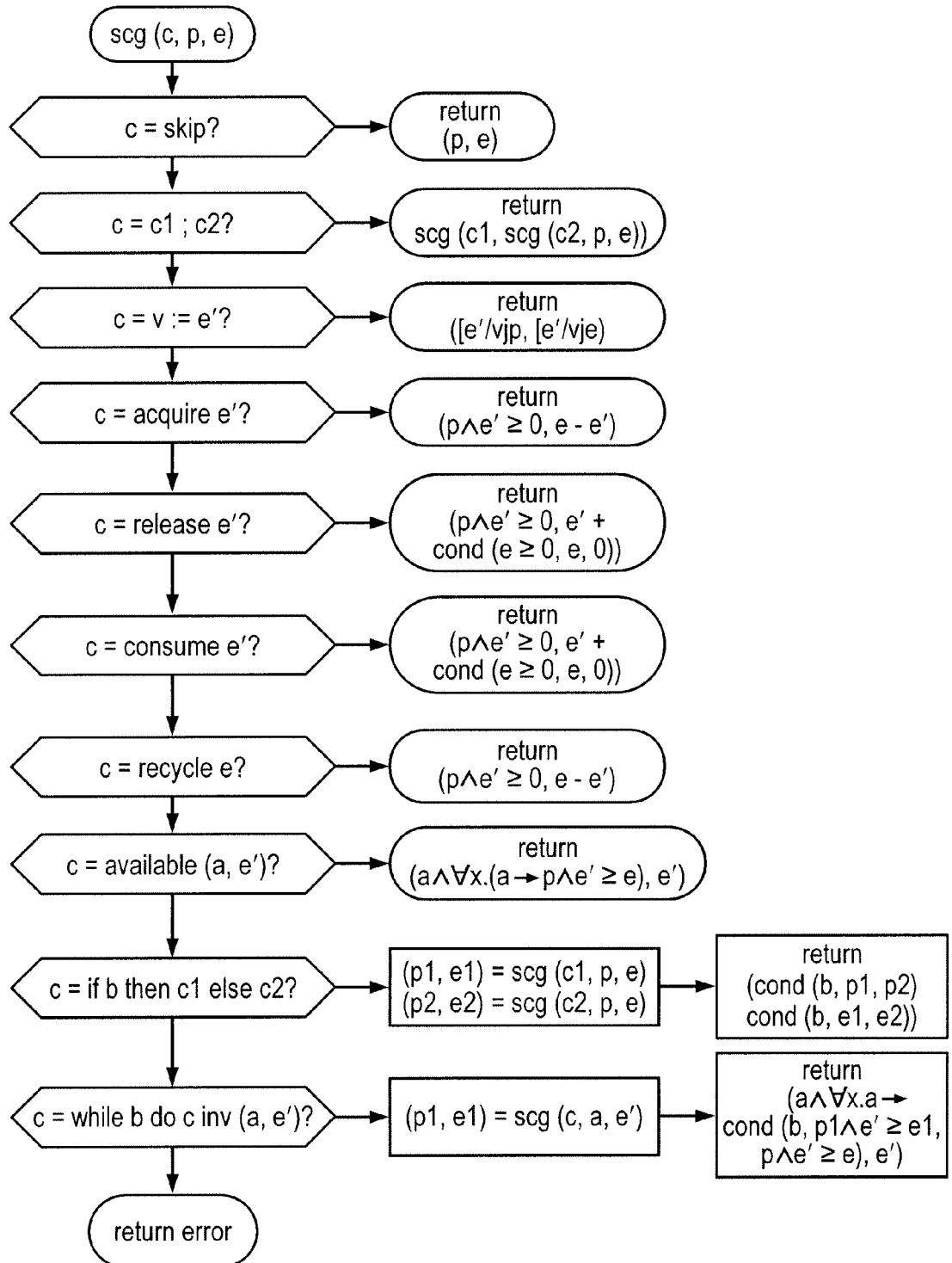
FIG. 15 is one embodiment of a flowchart of a safety condition generator
Figure 17:
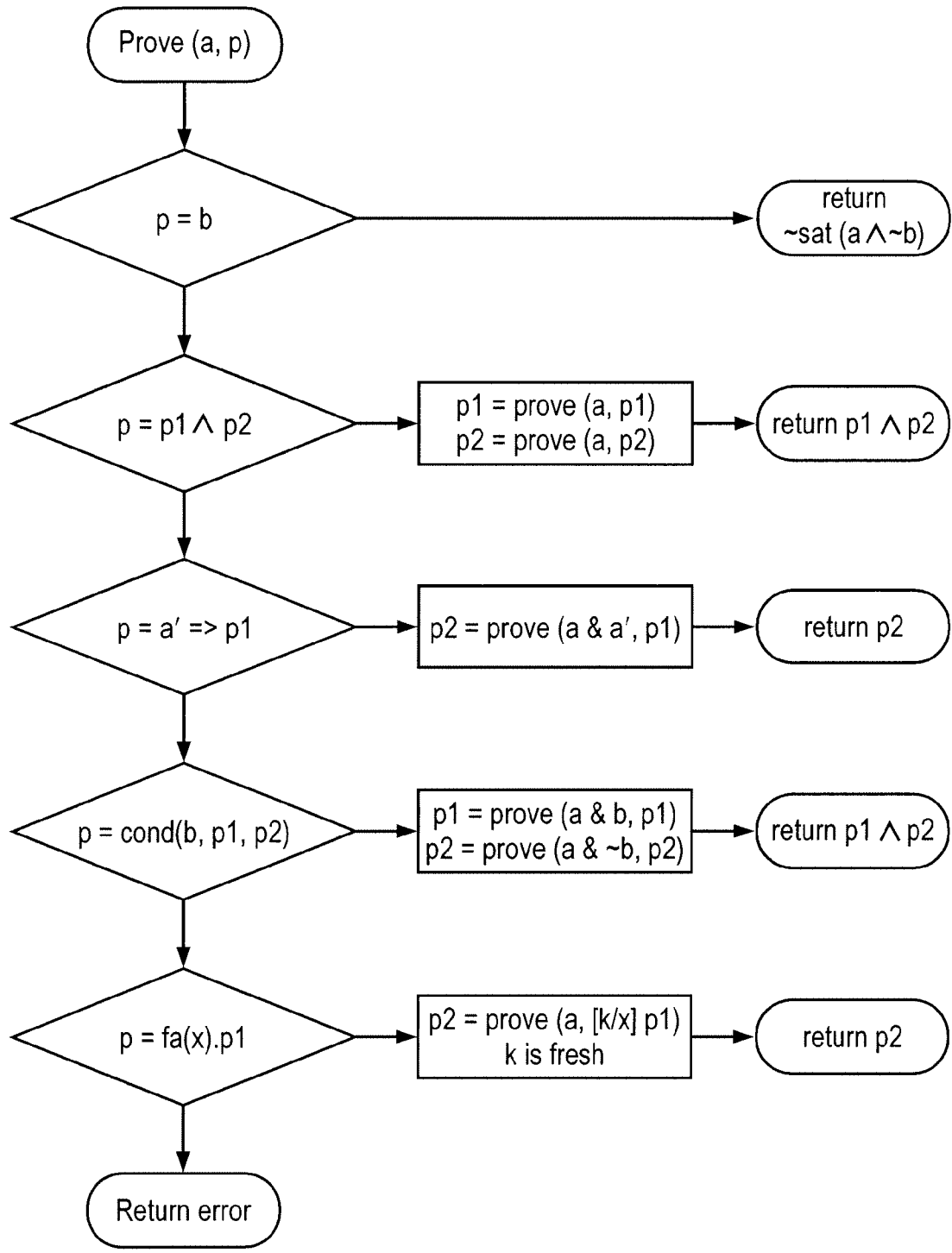
FIG. 17 is a flowchart depicting prover.

FIG. 14 is one embodiment of the code for the safety condition generator (scg), and FIG. 15 is a flowchart of the operation of one embodiment of a safety condition generator (scg). In several cases described herein, a function is presented in both code and flowchart forms. In all cases, the two forms are completely equivalent. The function scg(c, (P, e)) maps an invariant (P, e) that holds at the end of c to an invariant (P', e') that holds at the start of c. The scg is defined by recursion on the syntax of commands. In the flowcharts of FIGS. 15 and 17, $\forall x$ is denoted by fa(x).

An Exemplary Prover

In one embodiment, a safety condition generator is combined with a proof constructor to form a prover. The prover is used to prove the safety conditions. In one embodiment, the grammar for predicates restricts the left side of implications to annotations, not full predicates. Annotations are conjunctions of boolean expressions, and boolean expressions are equalities or inequalities between integer expressions.

The definitions respect this restriction. In one embodiment, all formulas on the left side of an implication arise from loop invariants, pre and post conditions, and available clauses.

Thus, a simple theorem prover prove : a×p→Bool is used where prove(A, P) holds if and only if A⇒P is valid. Valid means that the formula is true for all values of the global variables and of the constants introduced by the rule for universal quantification. Initially, in one embodiment, a call is made to prove(true, $SC_f$) to prove each function f's safety condition $SC_f$. FIG. 16 is one embodiment of code for the prover, while FIG. 17 is an equivalent flowchart depicting the prover.

To prove A⇒P, prove recursively decomposes P until it reaches a boolean expression b. It then uses a satisfiability procedure sat to check whether A⇒b is valid. As usual, A⇒b is valid if and only if its negation A ∧ ¬b is unsatisfiable. Thus, the expression sat is called on a conjunction of (possibly negated) boolean expressions. Since prove decomposes P using invertible rules, it is sound and complete if and only if sat is sound and complete.

The choice of satisfiability procedure depends on the form of Boolean expressions. If the inequalities are of the form $x \geq y+c$ or $x \geq c$, where c is a constant, and x and y are variables or uninterpreted terms, algorithms based on loop residues may be used (T. H. Cormen, C. E. Leiserson, and R. L. Rivest, An Introduction to Algorithms, The MIT Press, 1998, page 539). Shostak generalizes this algorithm to arbitrary inequalities (Robert Shostak, Deciding Linear Inequalities by Computing Loop Residue, Journal of the ACM, 28(4): 769-779, October 1981). Other notable algorithms are Sup-Inf (W. W. Bledsoe, The sup-Inf Method in Presurger Arithmetic, Technical Report, University of Texas Math Department, December 1974) and Simplex.

If the boolean expressions contain functions other than addition, subtraction, and multiplication by constants, we leave them uninterpreted. That is, only inferences are made that are sound for an arbitrary set of functions. That is, it is assumed only that functions map equal arguments to equal results. sat and prove are also complete for this system, because they make all such inferences. However, for the specific functions used in the program, they are incomplete. Because of this limitation, the programmer may want to restrict annotations to a form that sat can handle.

There are two notable satisfiability procedures that handle linear inequalities and uninterpreted functions. One is due to Nelson and Oppen (Greg Nelson, Techniques for Program Verification, Technical Report CSL-81-10, Xerox Palo Alto Research Center, 1981) and is implemented by the Stanford Pascal Verifier (David Luckham et al., Stanford Pascal Verifier User Manual, Technical Report STAN-CS-79-731, Department of Computer Science, Stanford University, March 1979) and the Extended Static Checker (Greg Nelson, Techniques for Program Verification, Technical report CSL-81-10, Xerox Palo Alto Research Center, 1981) (David Detlefs, An Overview of the Extended Static Checking System, In Proceedings of the First Formal Methods in Software Practice Workshop, 1996) (David L. Detlefs et al., Extended Static Checking, SRC Research Report 159, Compaq Systems Research Center, 130 Lytton Avenue, Palo Alto, December 1998). The other is due to Shostak (Robert E. Shostak, Deciding Combinations of Theories, Journal of the ACM, 31 (1):1-12, January 1984) and is implemented in the Prototype Verification System (PVS) (S. Owre et al., PVS: A Prototype Verification System, In Deepak Kapur, editor, $11^{th}$ International Conference on Automated Deduction (CADE), volume 607 of Lecture Notes in Artificial Intelligence, pp. 748-752, Saratoga, N.Y., June 1992, Springer-Verlag).

FIG. 18 shows a small loop written with the while command. In this case, the programmer annotates the loop with an invariant by hand. FIG. 19 shows the safety condition for this example. To derive it, the expression scg(c, true, 0) is computed. After some simplifications, it can be shown this safety condition is valid.

An Exemplary Mobile Phone

Figure 20:
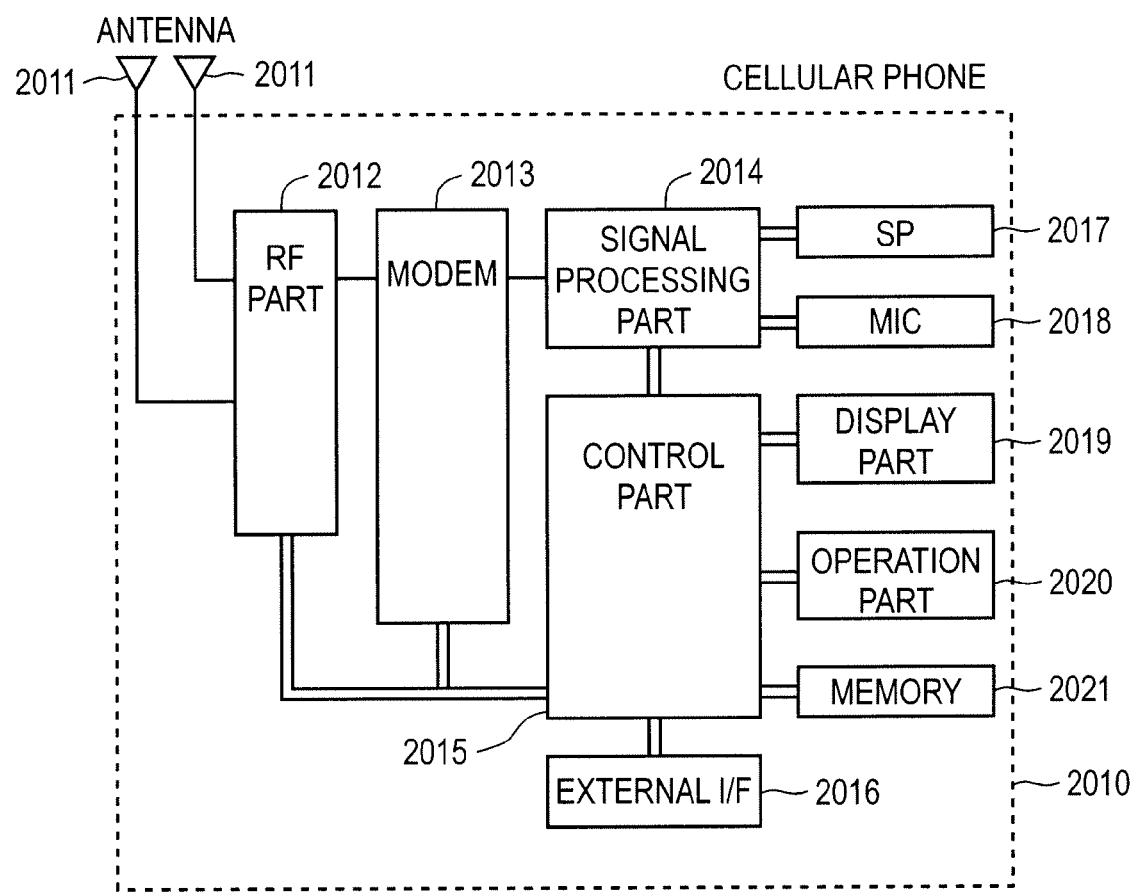
FIG. 20 is a block diagram of an exemplary cellular phone.

FIG. 20 is a block diagram of one embodiment of a cellular phone.

Referring to FIG. 20, the cellular phone 2010 includes an antenna 2011, a radio-frequency transceiver (an RF unit) 2012, a modem 2013, a signal processing unit 2014, a control unit 2015, an external interface unit (external I/F) 2016, a speaker (SP) 2017, a microphone (MIC) 2018, a display unit 2019, an operation unit 2020 and a memory 2021.

The external terminal 2030 includes an external interface (external I/F) 2031, a CPU (Central Processing Unit) 2032, a display unit 2033, a keyboard 2034, a memory 2035, a hard disk 2036 and a CD-ROM drive 2037.

CPU 2032 in cooperation with the memories of cellular phone 2010 (e.g., memory 2021, the memory 2035, and hard disk 2036) cooperate to perform the operations described above.

An Exemplary Computer System

Figure 21:
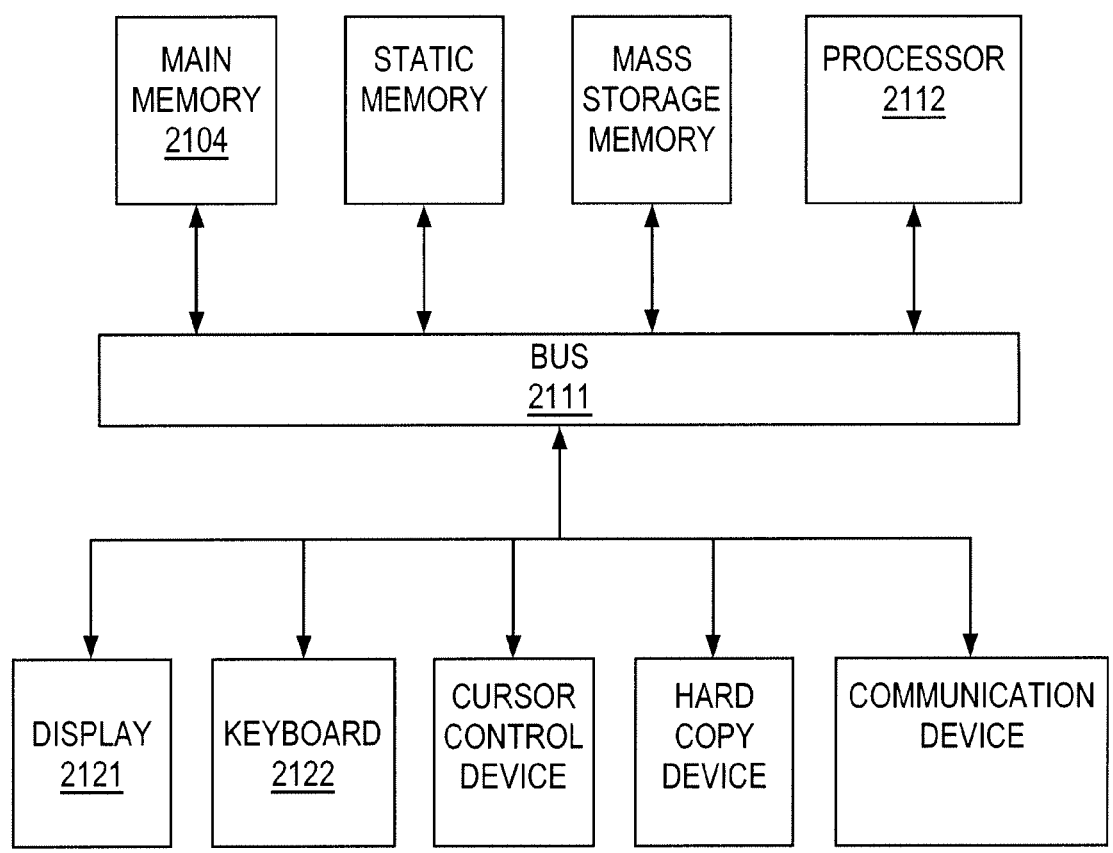
FIG. 21 is a block diagram of an exemplary computer system.

FIG. 21 is a block diagram of an exemplary computer system that may perform one or more of the operations described herein. Note that these blocks or a subset of these blocks may be integrated into a device such as, for example, a cell phone, to perform the techniques described herein.

Referring to FIG. 21, computer system 2100 may comprise an exemplary client or server computer system. Computer system 2100 comprises a communication mechanism or bus 2111 for communicating information, and a processor 2112 coupled with bus 2111 for processing information. Processor 2112 includes a microprocessor, but is not limited to a microprocessor, such as, for example, Pentium™, PowerPC™, Alpha™, etc.

System 2100 further comprises a random access memory (RAM), or other dynamic storage device 2104 (referred to as main memory) coupled to bus 2111 for storing information and instructions to be executed by processor 2112. Main memory 2104 also may be used for storing temporary variables or other intermediate information during execution of instructions by processor 2112.

Computer system 2100 also comprises a read only memory (ROM) and/or other static storage device 2106 coupled to bus 2111 for storing static information and instructions for processor 2112, and a data storage device 2107, such as a magnetic disk or optical disk and its corresponding disk drive. Data storage device 2107 is coupled to bus 2111 for storing information and instructions.

Computer system 2100 may further be coupled to a display device 2121, such as a cathode ray tube (CRT) or liquid crystal display (LCD), coupled to bus 2111 for displaying information to a computer user. An alphanumeric input device 2122, including alphanumeric and other keys, may also be coupled to bus 2111 for communicating information and command selections to processor 2112. An additional user input device is cursor control 2123, such as a mouse, trackball, trackpad, stylus, or cursor direction keys, coupled to bus 2111 for communicating direction information and command selections to processor 2112, and for controlling cursor movement on display 2121.

Another device that may be coupled to bus 2111 is hard copy device 2124, which may be used for printing instructions, data, or other information on a medium such as paper, film, or similar types of media. Furthermore, a sound recording and playback device, such as a speaker and/or microphone may optionally be coupled to bus 2111 for audio interfacing with computer system 2100. Another device that may be coupled to bus 2111 is a wired/wireless communication capability 2125 to communication to a phone or handheld palm device.

Note that any or all of the components of system 2100 and associated hardware may be used in the present invention. However, it can be appreciated that other configurations of the computer system may include some or all of the devices.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as essential to the invention.

What is claimed is:

1. A method comprising:
   receiving program code with annotations in the program code that each include an operation to specify a reservation or release of a resource from a pool of resources, wherein the annotations to the program code represent at least one static check and at least one dynamic check, and at least one of the annotations includes an operation to reserve at least one resource for use by a portion of the program code; and
   statically verifying information about one or more dynamic checks in the program code, each of the one or more dynamic checks in the program code to check an annotation operation in the program code and to compare the annotation operation to a security policy for resource allocation, wherein statically verifying information about one or more dynamic checks in the program code comprises statically checking one or more operations in the program code for reserving one or more resources to determine whether the one or more resources being reserved by the one or more operations are enough to account for all runtime operations that consume resources in the program code to satisfy the security policy, wherein the security policy specifies resources that the program code can use and the corresponding usage bounds.

2. The method defined in claim 1 wherein at least one of the dynamic checks determines if an operation is unsafe.

3. The method defined in claim 1 wherein statically verifying information about one or more dynamic checks is performed prior to run-time.

4. The method defined in claim 1 wherein statically verifying information prior to run-time about one or more dynamic checks in program code is for checking safety.

5. The method defined in claim 1 wherein at least one of the one or more dynamic checks comprise one or more annotations for specifying a resource reservation.

6. The method defined in claim 5 wherein the resource reservation is relevant to executing the program code safely.

7. The method defined in claim 1 wherein statically verifying information about one or more dynamic checks comprises checking whether the program code will use more of one or more resources during run-time that the program code has reserved prior to execution.

8. The method defined in claim 1 wherein statically verifying information about one or more dynamic checks comprises checking whether the program code will use more than a predetermined amount of resources.

9. The method defined in claim 1 further comprising adding the one or more dynamic checks into the program code.

10. The method defined in claim 1 further comprising performing dynamic checking of the program code by invoking the dynamic checks during run-time.

11. The method defined in claim 10 further comprising limiting resource usage by the program code in response to determining that resource usage is outside a bound.

12. The method defined in claim 11 wherein limiting resource usage by the program code comprises halting execution of the program code.

13. The method defined in claim 10 further comprising raising an exception in response to determining that resource usage is outside a bound.

14. The method defined in claim 10 further comprising generating an interrupt in response to determining that resource usage is outside a bound.

15. The method defined in claim 1 wherein at least one of the one or more dynamic checks is for checking usage of a resource.

16. The method defined in claim 15 wherein the resource comprises a physical resource.

17. The method defined in claim 16 wherein the physical resource comprises one selected from the group consisting of: central processing unit (CPU) instruction counts, memory space, disk space, network bandwidth, a device hardware operation, and a device software operation.

18. The method defined in claim 15 wherein the resource comprises a virtual resource.

19. The method defined in claim 18 wherein the virtual resource comprises one selected from the group consisting of: file handles, processes, and database connections.

20. An article of manufacture having one or more recordable media storing instructions which, when executed by a system, cause the system to perform a method comprising:
receiving program code with annotations in the program code that each include an operation to specify a reservation or release of a resource from a pool of resources, wherein the annotations to the program code represent at least one static check and at least one dynamic check, and at least one of the annotations includes an operation to reserve at least one resource for use by a portion of the program code; and
statically verifying information about one or more dynamic checks in the program code, each of the one or more dynamic checks in the program code for checking an annotation operation in the program code and to compare the annotation operation to a security policy for resource allocation, wherein statically verifying information about one or more dynamic checks in the program code comprises statically checking one or more operations in the program code for reserving one or more resources to determine whether the one or more resources being reserved by the one or more operations are enough to account for all runtime operations that consume resources in the program code to satisfy the security policy, wherein the security policy specifies resources that the program code can use and the corresponding usage bounds.

21. The article of manufacture defined in claim 20 wherein at least one of the dynamic checks determines if the operation is unsafe.

22. The article of manufacture defined in claim 20 wherein at least one of the one or more dynamic checks comprise one or more annotations for specifying a resource reservation.

23. The article of manufacture defined in claim 20 wherein statically verifying information about one or more dynamic checks comprises checking whether the program code will use more of one or more resources during run-time than the program code has reserved prior to execution.

24. The article of manufacture defined in claim 20 wherein the method further comprises performing dynamic checking of the program code by invoking the dynamic checks during run-time.

25. The article of manufacture defined in claim 24 wherein the method further comprises limiting resource usage by the program code in response to determining that resource usage is outside a bound.

26. The article of manufacture defined in claim 25 wherein limiting resource usage by the program code comprises halting execution of the program code.

27. The article of manufacture defined in claim 24 wherein the method further comprises raising an exception in response to determining that resource usage is outside a bound.

28. The article of manufacture defined in claim 24 wherein the method further comprises generating an interrupt in response to determining that resource usage is outside a bound.

29. The article of manufacture defined in claim 20 wherein at least one of the one or more dynamic checks is for checking usage of a resource.

* * * * *